(12) United States Patent
Dunlap et al.

(10) Patent No.: US 6,183,238 B1
(45) Date of Patent: Feb. 6, 2001

(54) PLASTIC BLOW MOLDING IN-MOLD LABELING SYSTEM

(75) Inventors: Richard L. Dunlap, Cairo; Edward L. Sanford, Lima; David M. Amirault, Troy, all of OH (US)

(73) Assignee: Plastipak Packaging, Inc., Plymouth, MI (US)

( * ) Notice: Under 35 U.S.C. 154(b), the term of this patent shall be extended for 0 days.

(21) Appl. No.: 09/335,580

(22) Filed: Jun. 18, 1999

(51) Int. Cl.[7] ................................................. B29C 49/24
(52) U.S. Cl. .................. 425/503; 264/509; 264/543; 425/126.1; 425/522; 425/532; 425/540
(58) Field of Search .................. 425/126.1, 522, 425/503, 504, 540, 532; 264/509, 543

(56) References Cited

U.S. PATENT DOCUMENTS

| | | | |
|---|---|---|---|
| 4,397,625 | * 8/1983 | Hellmer et al. | 425/522 |
| 4,479,770 | 10/1984 | Slat et al. | 425/503 |
| 4,582,474 | 4/1986 | Ziegler | 425/503 |
| 4,639,207 | * 1/1987 | Slat et al. | 425/503 |
| 4,680,000 | 7/1987 | Nowicki et al. | 425/126.1 |
| 4,729,731 | 3/1988 | Hasl et al. | 425/517 |
| 4,801,260 | 1/1989 | Oles et al. | 425/540 |
| 4,808,366 | 2/1989 | Kaminski et al. | 264/509 |
| 4,834,641 | 5/1989 | Keyser | 425/503 |
| 4,861,542 | 8/1989 | Oles et al. | 264/542 |
| 4,880,368 | 11/1989 | Hasl et al. | 425/116 |
| 4,909,723 | 3/1990 | Slat et al. | 425/503 |
| 4,944,665 | 7/1990 | Hasl et al. | 425/126.1 |
| 4,973,241 | 11/1990 | Keyser | 425/503 |
| 5,044,922 | 9/1991 | Plenzler et al. | 425/503 |
| 5,086,937 | 2/1992 | Robinson . | |
| 5,169,653 | 12/1992 | Tate et al. | 425/503 |
| 5,192,554 | 3/1993 | Savich | 425/504 |
| 5,240,718 | 8/1993 | Young et al. | 425/540 |
| 5,244,610 | 9/1993 | Kitzmiller | 264/40.1 |
| 5,275,780 | 1/1994 | Robinson | 264/543 |
| 5,344,305 | 9/1994 | McKillip | 425/503 |
| 5,350,483 | 9/1994 | Yager et al. | 425/503 |
| 5,383,779 | 1/1995 | Robinson | 425/525 |
| 5,665,404 | 9/1997 | Weber et al. | 425/503 |
| 5,698,241 | 12/1997 | Kitzmiller | 425/540 |
| 5,753,278 | 5/1998 | Aguilar | 425/503 |
| 5,759,593 | 6/1998 | Weber et al. | 425/503 |

FOREIGN PATENT DOCUMENTS

305050 A2 * 3/1989 (EP) ................................. 425/522

* cited by examiner

Primary Examiner—Robert Davis
(74) Attorney, Agent, or Firm—Brooks & Kushman P.C.

(57) ABSTRACT

An in-mold labeling system for use with a rotary blow molding machine (10) includes first and second electrical servomotors (46, 64) and first and second cam mechanisms (48, 66) respectively driven by the servomotors to move a dispensing head (36) between supply and delivery locations and to move a label carrier (38) on the dispensing head between retracted and label transfer positions independently of each other. A sensor (92) of the system senses rotation of a rotary wheel (12) of the machine to operate first and second electrical controllers (84,86) that respectively operate the first and second electrical servomotors (46,64) in coordination with the machine operation but independently of each other.

8 Claims, 5 Drawing Sheets

PLASTIC BLOW MOLDING IN-MOLD LABELING SYSTEM

TECHNICAL FIELD

This invention relates to an in-mold labeling system for use with rotary blow molding to provide an in-mold labeling operation.

BACKGROUND ART

In-mold labeling has been developed in the recent past to provide superior bonding of labels to blow molded containers. Such in-mold labeling is performed by inserting a label within an open mold prior to closing of the mold around an extruded hot plastic tube or a heated injection molded plastic preform. Subsequent mold closing and blow molding forms the hot plastic around the label to the shape of the mold and activates a heat sensitive adhesive that provides a permanent bond which is incapable of being broken by moisture or otherwise. Also, such in-mold labeling provides a smooth transition between the label and the adjacent surface of the container and further provides additional strength since the label cooperates with the container wall in resisting deformation. Such strengthening also allows the use of less plastic to blow mold the container and thereby reduces the ultimate cost to the consumer. Furthermore, when utilized with containers for carbonated beverages, the in-mold labeling reduces the flow of carbon dioxide out through the container wall over a period of time and thereby increases the shelf life.

U.S. Pat. No. 4,479,770 Slat et al., U.S. Pat. No. 4,582,474 Ziegler, U.S. Pat. No. 4,639,207 Slat et al., and U.S. Pat. No. 4,909,723 Slat et al. disclose in-mold labeling systems wherein a dispensing head of the in-mold labeling system is moved between a label supply location aligned with one or more label magazines adjacent the associated blow molding machine and a label delivery position within an adjacent open mold of the blow molding machine, and one or more label carriers on the dispensing head is moved between a retracted position and a label transfer position in order to provide a pick and place movement of the labels from the label magazines into the mold where a vacuum is drawn to secure the label to the mold before mold closing for the blow molding operation. A vacuum is also utilized by the label carrier to secure the labels for the movement from the associated label magazine to the associated mold.

In-mold labeling systems of the type described above have previously included a common mechanical drive from the blow molding machine for driving the dispensing head between the label supply and delivery locations and for also driving the label carriers between the retracted and label transfer positions. As such, the respective speeds and movements of the dispensing head and each label carrier are coupled with each other.

With relatively high speed labeling, it has been found that it is difficult to remove labels from a label magazine at a greater speed than about 65 to 70 labels per minute since such high speed operation does not allow time for air to enter behind the label as the label carrier pulls it from the label magazine. As such, more than one label can be pulled away and thereby cause problems in the in-mold labeling process.

Previously, in-mold labeling of a pair of labels to an associated pair of mold members of a mold has been performed in two ways. In one practice, a pair of rotary drive members that are spaced from each other and each rotates an associated lever that has a cam and follower connection to an associated label carrier to provide the label carrier movement between the retracted and label transfer positions. In another practice, a single rotary drive member is utilized and through a lever drives one label carrier that is connected by a gear and rack assembly to another label carrier so that both label carriers are concomitantly moved between the retracted and label transfer positions by the rotation of the one rotary drive member.

Other United States patents disclosing in-mold labeling for plastic blow molding include: U.S. Pat. No. 4,680,000 Nowicki et al.; U.S. Pat. No. 4,729,731 Hasl et al.; U.S. Pat. No. 4,801,260 Oles et al.; U.S. Pat. No. 4,808,366 Kaminski et al.; U.S. Pat. No. 4,834,641 Keyser; U.S. Pat. No. 4,861,542 Oles et al.; U.S. Pat. No. 4,880,368 Hasl et al.; U.S. Pat. No. 4,944,665 Hasl et al.; U.S. Pat. No. 4,973,241 Keyser; U.S. Pat. No. 5,044,922 Plenzler et al.; U.S. Pat. No. 5,086,937 Robinson; U.S. Pat. No. 5,169,653 Tate et al.; U.S. Pat. No. 5,192,554 Savich et al.; U.S. Pat. No. 5,275,780 Robinson; U.S. Pat. No. 5,344,305 McKillip; U.S. Pat. No. 5,350,483 Yager et al.; U.S. Pat. No. 5,383,779 Robinson; U.S. Pat. No. 5,665,404 Weber et al.; U.S. Pat. No. 5,753,278 Aguilar; and U.S. Pat. No. 5,759,593 Weber et al.

DISCLOSURE OF INVENTION

An object of the present invention is to provide an improved in-mold labeling system for use with a rotary blow molding machine including a rotary wheel having molds thereon movable between open and closed positions to perform blow molding.

In carrying out the above object, the in-mold labeling system of the invention includes at least one label magazine for storing a supply of labels at a location adjacent the rotary wheel of the blow molding machine. A dispensing head of the system includes at least one label carrier for transferring the labels from the label magazine to the open molds prior to mold closing for the blow molding. The system includes a first electrical servomotor and a first cam mechanism driven thereby to move the dispensing head between a supply location adjacent the label magazine and a delivery location between an open mold on the rotary wheel. The system also includes a second servomotor and a second cam mechanism driven thereby to move the label carrier of the dispensing head between a retracting position and a label transfer position. First and second electrical controllers of the system respectively operate the first and second servomotors. A sensor of the system senses rotation of the rotary wheel of the blow molding machine to operate the first and second controllers to separately drive the first and second servomotors such that the label carrier is moved from the retracted position to the label transfer position while the dispensing head is in the supply location to receive a label from the label magazine and is then moved back to the retracted position for movement of the dispensing head to the delivery location where the label carrier is again moved to the label transfer position to transfer the label to an adjacent open mold prior to mold closing for the blow molding.

In the preferred construction disclosed, the system includes a pair of label magazines for supplying two labels to the dispensing head upon label carrier movement from the retracted position to the label transfer position and then back to the retracted position with the dispensing head in the supply location and for subsequently simultaneously supplying the two labels to two adjacent open molds by label carrier movement from the retracted position to the label transfer position and then back to the retracted position with the dispensing head in the delivery location. The second controller operates the second servomotor faster while the dispensing head is in the delivery location than while in the supply location. More specifically, the second controller can be programmed to operate the second servomotor twice as fast in the delivery location than while in the supply location.

In the preferred construction of the in-mold labeling system, the dispensing head includes two pairs of label carriers movable in opposite directions as each other and also includes two pair of label magazines for respectively supplying two labels to each pair of the label carriers upon movement from the retracted position to the label transfer position and then back to the retracted position while the dispensing head is in the supply location and for subsequently simultaneously suppling the two labels on each pair of label carriers to two adjacent molds by movement from the retracted position to the label transfer position and then back to the retracted position while in the delivery location. The second controller operates the second servomotor faster while the dispensing head is in the delivery location than while in the supply location and, as previously mentioned, can be programmed to operate the second servomotor twice as fast in the delivery location than while in the supply location.

In the preferred construction, the sensor of the system is an optical encoder that operates the first and second controllers.

In the preferred construction disclosed, the in-mold labeling system is used with a blow molding machine having an extruder that extrudes a hot plastic parison into the open mold for the mold closing and the blow molding.

BEST MODE FOR CARRYING OUT THE INVENTION

Figure 1:
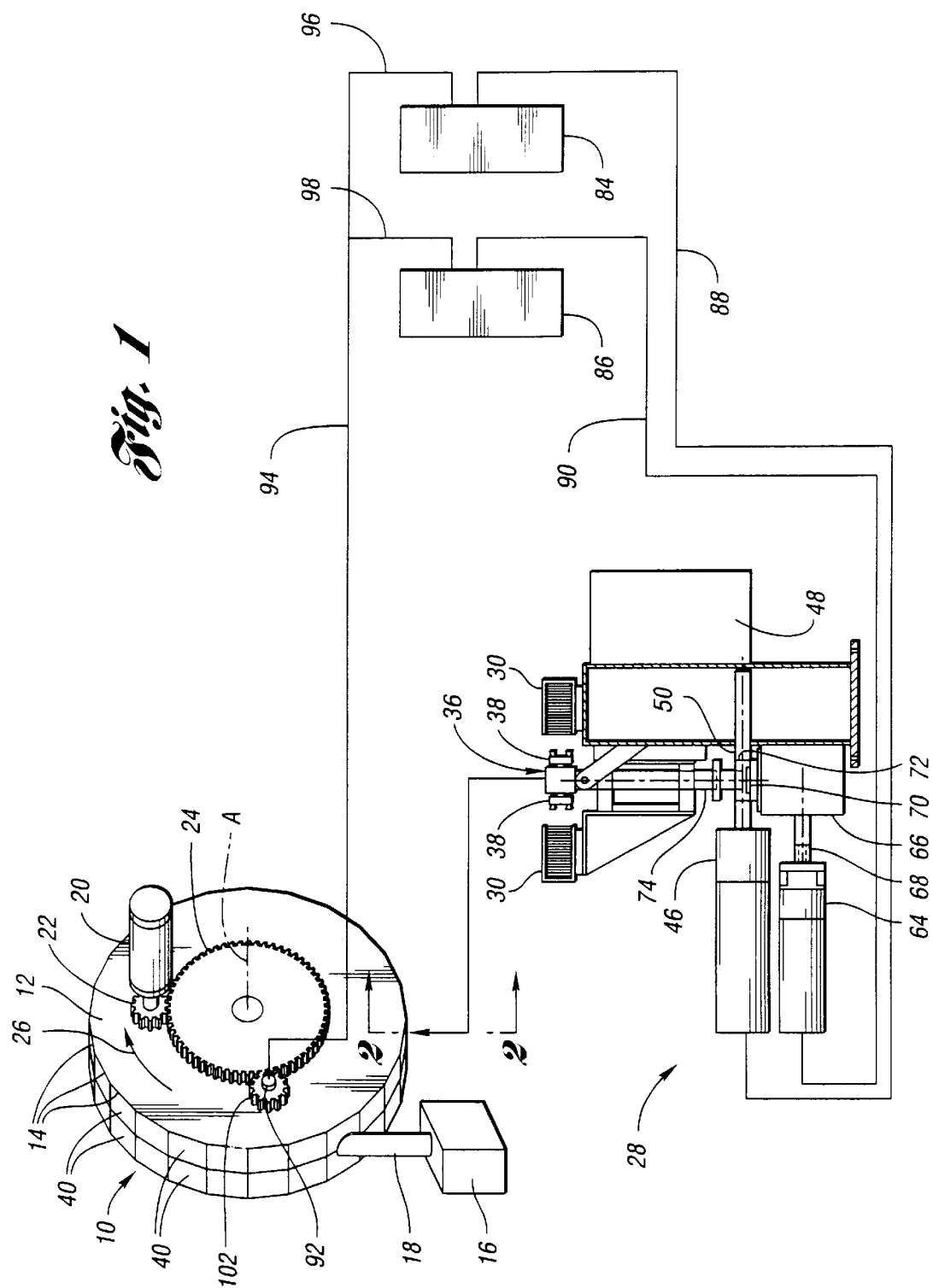
FIG. 1 is a schematic view of an in-mold labeling system that embodies the invention.
Figure 3:
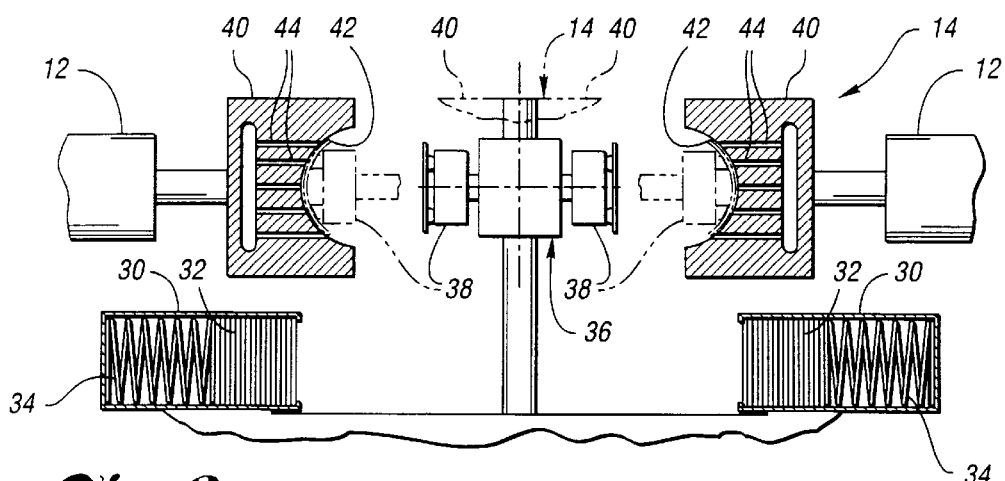
FIG. 3 is a view similar to FIG. 2 but illustrating the dispensing head located in a delivery location within the open mold after outward movement of the label carriers has transferred the labels to the mold members of the open mold which have vacuum passages that secure each label for the mold closing and blow molding operation.

With reference to the schematic illustration in FIG. 1, a rotary blow molding machine 10 includes a rotary wheel 12 having a plurality of molds 14 that are movable between open and closed positions as illustrated respectively by solid and partial phantom line representation in FIG. 3. An extruder 16 shown in FIG. 1 extrudes an upwardly directed hot tubular plastic parison 18 that is received between the molds before closing for the blow molding operation. A schematically indicated drive motor 20 has a rotary output gear 22 that rotatively drives a main drive gear 24 on the blow molding wheel 12 so as to rotate about a central axis A in the direction illustrated by arrow 26. Operation of the blow molding machine 10 can be controlled in any conventional manner such as disclosed by U.S. Pat. No. 5,240,718 Young et al.; U.S. Pat. No. 5,244,610 Kitzmiller; and U.S. Pat. No. 5,698,241 Kitzmiller, the entire disclosures of which are hereby incorporated by reference.

With continuing reference to FIG. 1, an in-mold labeling system embodying the invention is generally indicated by 28 and is operable to provide an in-mold labeling operation as is hereinafter more fully described. This in-mold labeling system as illustrated in FIGS. 1–4 includes at least one label magazine 30 for storing a supply of labels 32 at a location adjacent the rotary wheel 12 of the blow molding machine. As is hereinafter more fully described, there are actually two of the label magazines 30 respectively associated with each side of the rotary wheel 12, such that there are four label magazines utilized in the system as shown. Each label magazine 30 includes a spring 34 that biases the associated stack of labels 32 such that their edges are engaged with spaced fingers of the magazine.

Figure 2:
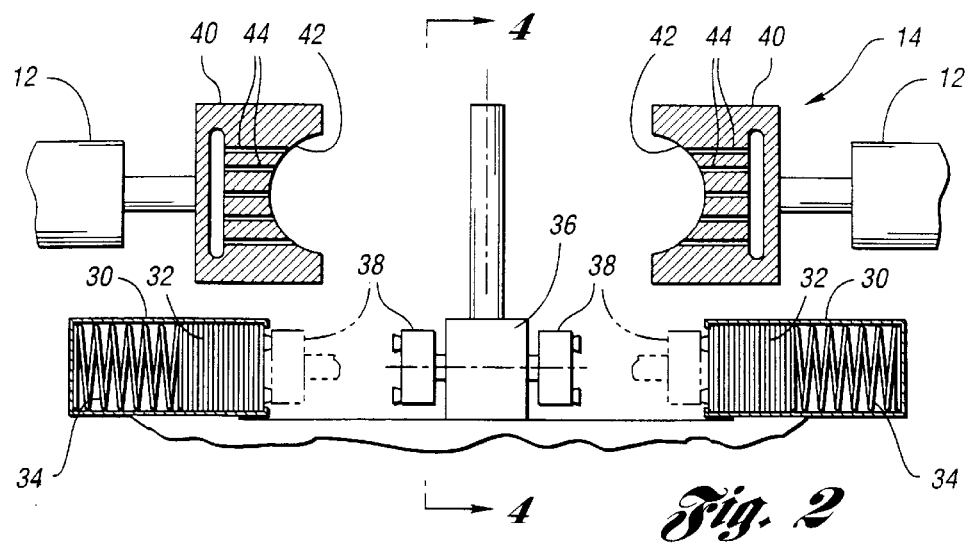
FIG. 2 is a sectional view taken generally along the direction of line 2—2 in FIG. 1 to illustrate label magazines, a dispensing head that is shown in a supply location and has label carriers that are movable between solid line indicated retracted position and phantom line indicated label transfer position to pick labels from the label magazines.

With continuing reference to FIGS. 1–4, the in-mold labeling system 28 includes a dispensing head 36 having at least one label carrier 38 for transferring the labels 32 from the label magazine 30 to the open molds 14 prior to closing for the blow molding. Each mold as shown in FIGS. 2 and 3 includes a pair of mold members 40 that have cavity sections 42 for defining a mold cavity when the mold members are moved to the closed position as shown by partial phantom line representation in FIG. 3. Vacuum passages 44 of the mold member secure the labels in position after being received from the dispensing head 36 as is hereinafter more fully described. The label carriers are also supplied with a vacuum for holding the labels during the transfer from the label magazines to the molds.

Figure 5:
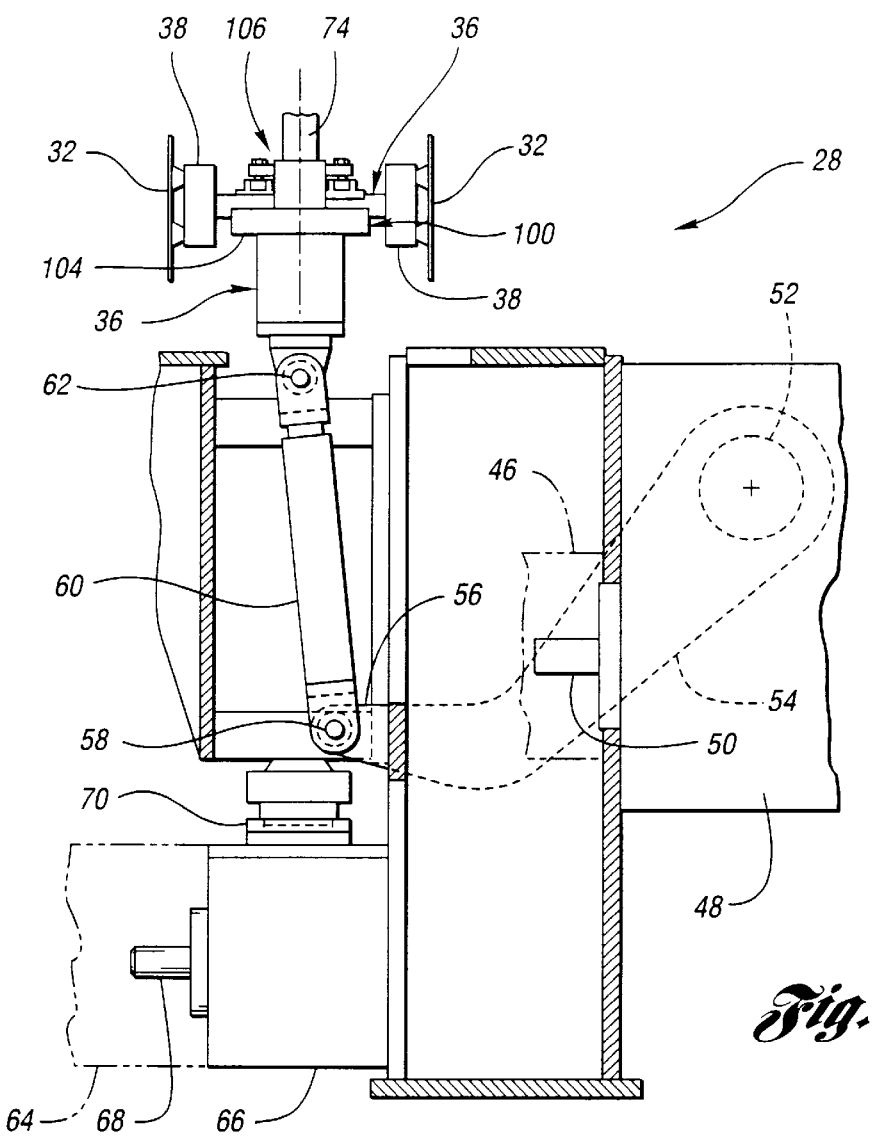
FIG. 5 is an elevational view taken generally along the direction of line 5—5 in FIG. 4 to illustrate first and second servomotors and associated cam mechanisms that respectively move the dispensing head between the supply location adjacent the label magazine and the delivery location between the open mold on the rotary wheel of the blow molding machine and move each label carrier on the dispensing head between its retracted and label transfer positions.

As illustrated in FIGS. 1 and 5, the in-mold labeling system 28 includes a first electrical servomotor 46 and a first cam mechanism 48 driven thereby to move the dispensing head 36 between the supply location shown in FIG. 2 adjacent the label magazines 30 and the delivery location shown in FIG. 3 within the adjacent open mold 14. More specifically, the first cam mechanism 48 has an input 50 that is rotatively driven by the first servomotor 46 and has an output 52 that is rotatively driven in an oscillating manner and connected to a lever arm 54. A distal end 56 of lever arm 54 has a pivotal connection 58 to one end of a link 60 whose other end has a pivotal connection 62 to the dispensing head 36. Operation of the first servomotor 46 through the first cam mechanism 48 thus pivots the lever arm 54 and moves the link 62 connected thereto to move the dispensing head 36 between the supply location shown in FIG. 2 and the delivery location shown in FIG. 3 as previously described.

With continuing reference to FIGS. 1 and 5, the in-mold labeling system also includes a second electrical servomotor 64 and a second cam mechanism 66 driven by the second servomotor to move each label carrier 38 between the solid line indicated retracted position shown in FIGS. 2 and 3 and the phantom line indicated label transfer position also shown at both the supply location adjacent the label magazines 30 as illustrated in FIG. 2 and the delivery location within the adjacent open mold 14 as shown in FIG. 3. More specifically, the second electrical servomotor 64 has an output that drives an input 68 of the second cam mechanism in an oscillating manner, and an output 70 of the second cam mechanism drives a linkage 72 that rotatively oscillates a pair of rotary drive members 74 that actuate the label carrier movement as is hereinafter more fully described. The linkage 72 may be of the type disclosed by U.S. Pat. No. 4,909,723 Slat et al., the entire disclosure of which is hereby incorporated by reference.

Figure 6:
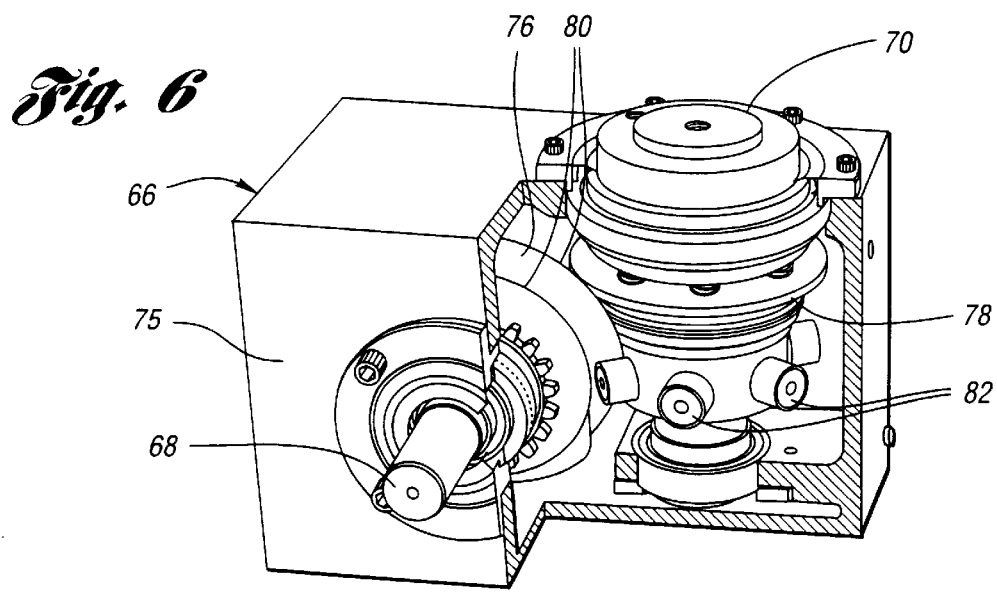
FIG. 6 is a partially broken away view illustrating the cam mechanism that moves the label carriers of the dispensing head between the retracted and label transfer positions and is also illustrative of the general construction of the cam mechanism that moves the dispensing head between the supply and delivery locations.

As illustrated in FIG. 6, the second cam mechanism 66, which is also illustrative of the first cam mechanism 48, has its input 68 and output 70 supported about associated axes that are in an orthogonal relationship with respect to each other. More specifically, the cam mechanism 66 has a housing 75 that rotatably supports a drive cam 76 connected to the input 68 and also rotatably supports a cam follower 78 connected to the output 70. The drive cam 76 includes threadlike cam projections 80 that receive follower members 82 on the cam follower 78 that drives the output 70. Oscillating rotation of the input 68 rotatively oscillates the output 70 through the drive cam 76 and cam follower 78. At all times, the drive cam 76 has two projections 80 between which a follower member 82 is located which allows accurate movement without any overtravel due to inertia.

As illustrated in FIG. 1, the in-mold labeling system 28 includes first and second electrical controllers 84 and 86 having associated connections 88 and 90 for respectively operating the first and second servomotors 46 and 64 which can thus be controlled independently of each other. A sensor 92 of the in-mold labeling system 28 senses rotation of the rotary wheel 12 of the blow molding machine and has a connection 94 with respective connections 96 and 98 to the first and second controllers 84 and 86 which are thus operated to separately drive the first and second servomotors 46 and 64 to provide the in-mold labeling operation.

With reference to FIGS. 1–4, a cycle of operation of the in-mold labeling system 28 will now be described. Initially, the first servomotor 46 through the first cam mechanism 48 positions the dispensing head 36 in the supply location adjacent the label magazines 30 as illustrated in FIG. 2. The second servomotor 64 is then operated to move the label carriers 38 from the solid line indicated retracted position to the phantom line indicated label transfer position adjacent the labels 32 such that the vacuum drawn at each label carrier secures the exposed label. Continued operation of the second servomotor 64 then moves the label carriers 38 back to the retracted position and the first servomotor 46 moves the dispensing head 36 from the supply location shown in FIG. 2 back to the delivery location shown in FIG. 3. At the delivery location, the second servomotor 64 drives the label carriers 38 from the solid line indicated retracted position to the phantom line indicated label transfer position within the cavity sections 42 of the mold members 40 of the adjacent open mold 14. The vacuum drawn at the passages 44 of the mold members 40 secures the labels 32 within the mold and the label carriers 38 are then moved back to the retracted positions shown by solid line representation and the dispensing head 36 is driven back to the supply location shown in FIG. 2 in preparation for the next cycle. Movement of the mold members 40 to the closed position partially indicated by phantom line representation in FIG. 3 encloses the parison 18 (FIG. 1) located within the mold and commences the blow molding cycle as the container is blown against the label to provide an in-mold labeled product.

The construction and operation of the in-mold labeling system 28 as described above thus allow both the movement of the dispensing head 36 and the movement of the label carriers 38 to be coordinated with the rotation of the rotary wheel 12 of the blow molding machine while still being controllable independently of each other as necessary to facilitate the in-mold labeling operation.

Figure 4:
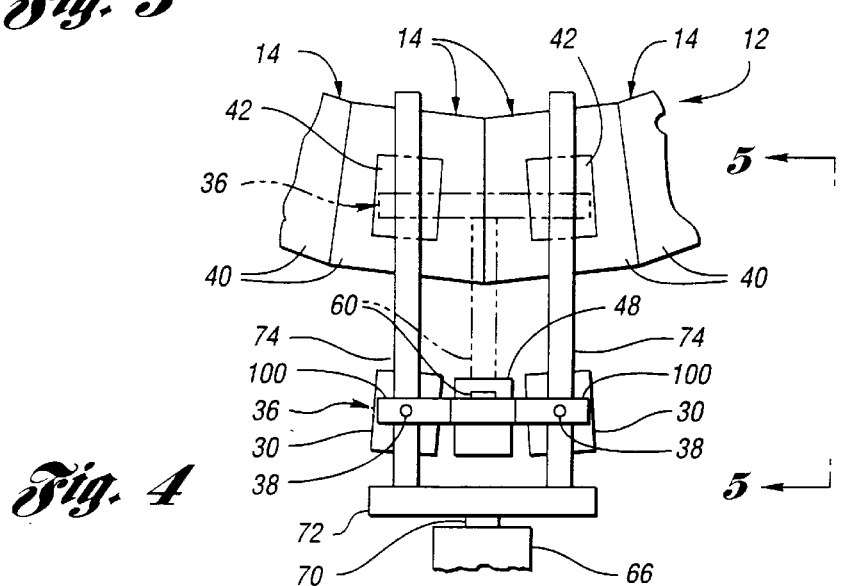
FIG. 4 is an elevational view taken generally along the direction of line 4—4 in FIG. 2 to illustrate the manner in which the dispensing head provides in-mold labeling of a pair of the molds during each of its cycles of movement.

As previously mentioned and as illustrated in FIG. 4, the system includes a pair of label magazines 30 for supplying two labels 32 to each side of the dispensing head 36 upon label carrier movement from the retracted position to the label transfer position and then back to the retracted position with the dispensing head in the supply location shown in FIG. 2 as previously described. Subsequently the dispensing head simultaneously supplies the two labels 32 at each side of the dispensing head 36 to two adjacent open molds 14 by label carrier movement from the retracted position to the label transfer position and then back to the retracted position with the dispensing head 36 in the delivery location as previously described in connection with FIG. 3. The second controller 86 (FIG. 1) operates the second servomotor 64 faster while the dispensing head 36 is in the delivery location of FIG. 3 than while in the supply location of FIG. 2 such that the label carrier movement is faster upon being transferred to the molds than while being removed from the label magazines. This supply of labels to more than one mold by the dispensing head thus allows slower removal of the labels from the label magazines such that a faster effective rate of labeling can be provided than is possible when only one mold is labeled during each cycle and the system is limited by the speed at which the labels can be withdrawn from the label magazines without pulling out the next label due to the limitation involved with how fast the air can move behind the labels as they are withdrawn from the label magazine. Thus, while prior art systems have not been able to supply labels to more than about 65 to 70 molds per minute, the present system can effectively label about twice as fast. More specifically, the second controller 86 shown in FIG. 1 can be operated to drive the second servomotor 46 that provides the label carrier movement twice as fast in the delivery location than while in the supply location.

Figure 7:
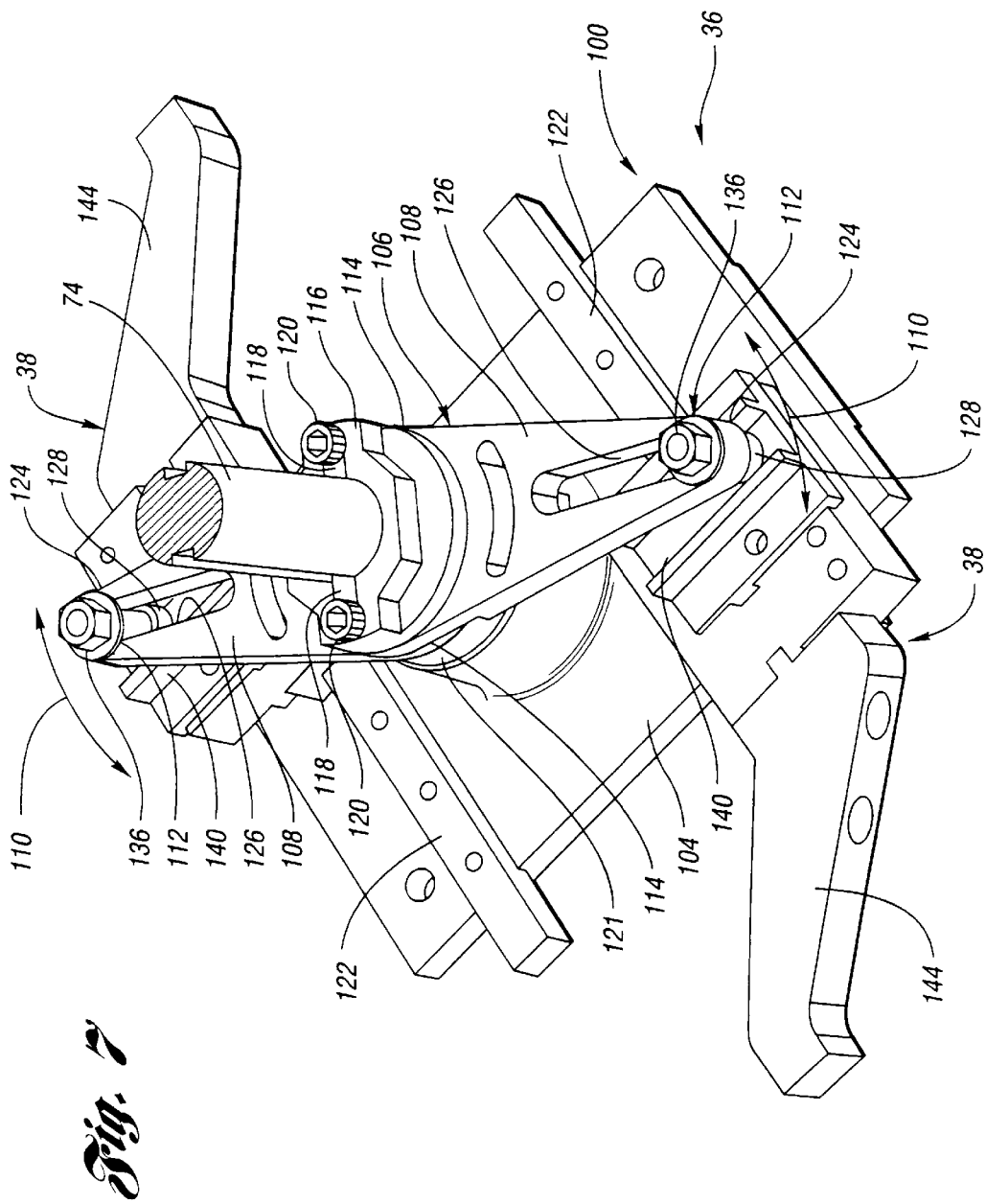
FIG. 7 is a perspective view illustrating the construction of a dispensing head unit of the in-mold labeling system.
Figure 9:
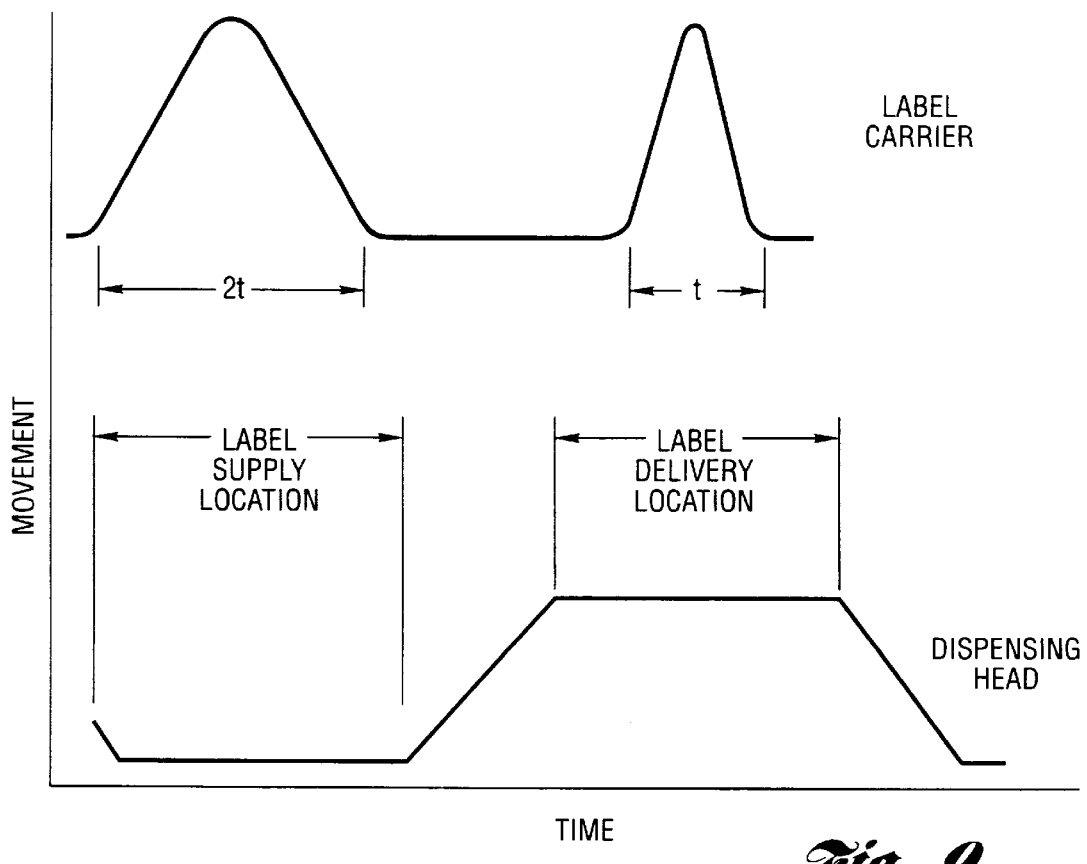
FIG. 9 is a schematic view illustrating operation of the in-mold labeling system by showing the relative movements timewise of both the dispensing head and each label carrier in coordination with each other.

The dispensing head 36 includes two subheads 100 whose construction is illustrated in FIG. 7 and which will be hereinafter described in greater detail. Each dispensing head subhead 100 includes a pair of label carriers 38 movable in opposite directions as each other such that there are two pairs of label carriers supported by the dispensing head. With combined reference to FIGS. 1 and 4, the system also includes two pairs of label magazines 30 for respectively supplying two labels to each pair of the label carriers 38 upon movement from the retracted position to the label transfer position and then back to the retracted position while the dispensing head 36 is in the supply location shown in FIG. 2 as previously described. Subsequently, the operation simultaneously supplies the two pairs of labels on each pair of label carriers 38 to two adjacent open molds 14 as shown in FIG. 4 by movement from the retracted position to the label transfer position and then back to the retracted position while in the delivery location illustrated in FIG. 3 as previously described. The second controller 86 of the in-mold labeling system shown in FIG. 1 operates the second servomotor 64 faster while the dispensing head is in the delivery location than while in the supply location as previously described and, more specifically, can be programmed to operate the second servomotor twice as fast in the delivery location than while in the supply location as illustrated schematically in FIG. 9.

The sensor 92 illustrated in FIG. 1 is preferably an optical encoder that operates the first and second electrical controllers 84 and 86 and is most preferably operated by a pinion gear 102 that is meshed with the main drive gear 24 of the rotary wheel 12.

The specific blow molding machine 10 with which the in-mold labeling system 28 is utilized includes the extruder 16 that extrudes a tubular hot plastic parison 18 into the open mold for the blow molding after the mold closing as previously discussed, which is a construction for which the in-mold labeling system has particular utility. However, it is also possible for the in-mold labeling system to be utilized with other types of blow molding such as injection and injection-stretch blow molding wherein an injection molded hot preform is positioned within the mold after the in-mold labeling.

With reference to FIG. 7, the dispensing head 36 as previously mentioned includes two subheads 100 each of which includes a head member 104 that is moved by the first cam mechanism 48 and its lever arm 54 and connecting link 60 illustrated in FIG. 5 as previously discussed. Each subhead 100 as illustrated in FIG. 7 includes a pair of label carriers 38 mounted on the head member 104 for movement between the retracted position and the label transfer position as previously described. Each subhead 100 also has an associated rotary drive member 74 of which there are two, as illustrated in FIG. 4, rotatably driven in an oscillating manner by the linkage 72 that is driven by the output 70 (FIG. 6) of the second cam mechanism 66 that is driven by the second servomotor 64 (FIG. 1) operated by the second controller 86 in response to the blow molding machine operation as previously discussed. Each subhead 100 also includes a lever assembly 106 (FIG. 7) that is rotatively driven in an oscillating manner by the associated rotary drive member 74. The lever assembly 106 includes a pair of levers 108 that extend outwardly from the rotary drive member 74 and are adjustable independently of each other as shown by arrow 110. Rotary oscillation of the drive member 74 rotatively oscillates the lever assembly 106 and each of its levers 108 under the driving operation previously described. Each lever 108 has a connection 112 to an associated label carrier 38 such that oscillating rotation of the rotary drive member 74 provides movement of the label carriers between the retracted and label transfer positions, such that the label carriers are moved from the retracted position to the label transfer position while the dispensing head is in the supply location shown in FIG. 2 to receive labels from the associated label magazine 30 and are then moved back to the retracted position for movement of the dispensing head 36 to the delivery location shown in FIG. 3 where the label carriers are again moved to the label transfer position to transfer the labels to the adjacent open mold prior to mold closing for the blow molding as previously described.

Figure 8:
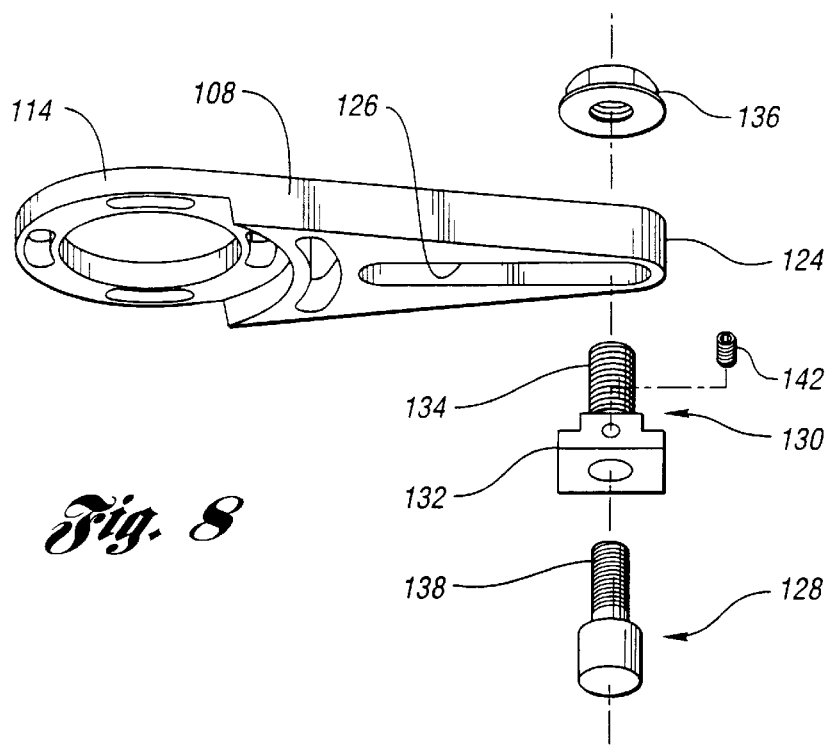
FIG. 8 is a perspective of a lever of the dispensing head and a cam and cam mount that supports the cam on the lever.

Each lever 108 has a construction as generally illustrated in FIG. 8 including an inner end 114 through which the associated rotary drive member extends. The pair of levers 108 extend as illustrated in FIG. 7 in generally opposite directions from each other, but with slight variance therefrom being possible to accommodate for necessary adjustment that controls the required amount of label carrier movement for the particular product being produced. A key ring 116 extends around the rotary drive member 74 as shown in FIG. 7 and had diametrically opposite keys 118 that are slidably received within diametrically opposite longitudinal grooves in the rotary drive member 74 so as to permit rotation therewith while permitting the movement of the dispensing head along the length of the rotary drive member between the supply and delivery locations previously described. A pair of bolts 120 secure the keys 118 and extend through aligned arcuate slots in the pair of levers 108 at their inner ends to secure the lever assembly to a spindle 121 rotatively supported on the head member 104.

With continuing reference to FIG. 7, the subhead 100 of the dispensing head 36 includes a pair of linear rails 122 mounted on the head member 104 in a parallel relationship to each other with the associated rotary drive member located between the pair of rails. The label carriers 38 are respectively mounted by the pair of rails 122 for movement between the retracted and label transfer positions previously described. Each connection 112 of the subhead is a cam and follower connection that extends between the associated lever 108 and the associated label carrier 38 to move the label carriers between the retracted and label transfer positions under the impetuous of the rotary drive member 74.

As illustrated by continuing reference to FIG. 7, each of the pair of levers 108 has a distal end 124 including an elongated slot 126 that extends radially with respect to the rotation of the rotary drive member 74. Each cam and follower connection as illustrated in FIG. 8 includes a cam 128 having a mount 130 including a T-shaped member 132 with a shank 134 that extends through the slot 126 in the distal end 124 of the associated lever 108. Each mount 130 also includes a nut 136 that is secured to the threaded shank 134 of the T-shaped member 132 on the other side of the distal end 124 of the lever 108 to provide securement thereof at the appropriate location. The cam 128 of each cam and follower connection has a threaded shank 138 that is threaded into the associated T-shaped member 132. Each cam and follower connection 112 also has an elongated follower 140 mounted as shown in FIG. 7 on the associated label carrier 38 and receiving the associated cam so as to be moved thereby under the impetus of the rotary drive member. Thus, the oscillating rotation of the rotary drive member moves the lever assembly 106 and the pair of levers 108 thereof and the cam and follower connections 112 move the label carriers 38. As shown in FIG. 8, each cam and follower connection also includes a set screw 142 that secures the threaded shank 138 of the cam 128 to the associated T-shaped member 132. The flat sides of the T-shaped member 132 engage the sides of the associated lever slot 126 to provide a firm support for the cam. Also, each label carrier 38 includes a plastic arm 144 that easily breaks in case of a malfunction to prevent extensive damage. One or more unshown vacuum cups are mounted by the plastic arms and supplied a vacuum that secures the labels.

While the best mode for carrying out the invention has been described in detail, other modes for practicing the invention can also be utilized as described by the following claims.

What is claimed is:

1. An in-mold labeling system for use with a rotary blow molding machine including a rotary wheel having molds thereon movable between open and closed positions to perform blow molding, comprising:

at least one label magazine for storing a supply of labels at a location adjacent the rotary wheel of the blow molding machine;

a dispensing head including at least one label carrier for transferring the labels from the label magazine to the open molds prior to mold closing for the blow molding;

a first electrical servomotor and a first cam mechanism driven thereby to move the dispensing head between a supply location adjacent the label magazine and a delivery location between an open mold on the rotary wheel;

a second electrical servomotor and a second cam mechanism driven thereby to move the label carrier of the dispensing head between a retracted position and a label transfer position;

first and second electrical controllers for respectively operating the first and second servomotors; and a sensor for sensing rotation of the rotary wheel of the blow molding machine to operate the first and second controllers to separately drive the first and second servomotors such that the label carrier is moved from the retracted position to the label transfer position while the dispensing head is in the supply location to receive a label from the label magazine and is then moved back to the retracted position for movement of the dispensing head to the delivery location where the label carrier is again moved to the label transfer position to transfer the label to an adjacent open mold prior to mold closing for the blow molding.

2. An in-mold labeling system as in claim 1 which includes a pair of label magazines for supplying two labels to the dispensing head upon label carrier movement from the retracted position to the label transfer position and then back to the retracted position with the dispensing head in the supply location and for subsequently simultaneously supplying the two labels to two adjacent open molds by label carrier movement from the retracted position to the label transfer position and then back to the retracted position with the dispensing head in the delivery location, and the second controller operating the second servomotor faster while the dispensing head is in the delivery location than while in the supply location.

3. An in-mold labeling system as in claim 2 wherein the second controller operates the second servomotor twice as faster in the delivery location than while in the supply location.

4. An in-mold labeling system as in claim 1 wherein the dispensing head includes two pairs of label carriers movable in opposite directions as each other, and the system also including two pairs of label magazines for respectively supplying two labels to each pair of the label carriers upon movement from the retracted position to the label transfer position and then back to the retracted position while the dispensing head is in the supply location and for subsequently simultaneously supplying the two labels on each pair of label carriers to two adjacent open molds by movement from the retracted position to the label transfer position and then back to the retracted position while in the delivery location, and the second controller operating the second servomotor faster while the dispensing head is in the delivery location than while in the supply location.

5. An in-mold labeling system as in claim 4 wherein the second controller operates the second servomotor twice as fast in the delivery location than while in the supply location.

6. An in-mold labeling system as in claim 1 wherein the sensor is an optical encoder that operates the first and second controllers.

7. A rotary blow molding machine comprising:

a rotary wheel having molds thereon movable between open and closed positions;

an extruder that extrudes a hot plastic parison into an open mold for the blow molding after the mold closing; and an in-mold labeling system including:

at least one label magazine for storing a supply of labels at a location adjacent the rotary wheel of the blow molding machine;

a dispensing head including at least one label carrier for transferring the labels from the label magazine to the open molds prior to mold closing for the blow molding;

a first electrical servomotor and a first cam mechanism driven thereby to move the dispensing head between a supply location adjacent the label magazine and a delivery location between an open mold on the rotary wheel;

a second electrical servomotor and a second cam mechanism driven thereby to move the label carrier of the dispensing head between a retracted position and a label transfer position;

first and second electrical controllers for respectively operating the first and second servomotors; and a sensor for sensing rotation of the rotary wheel of the blow molding machine to operate the first and second controllers to separately drive the first and second servomotors such that the label carrier is moved from the retracted position to the label transfer position while the dispensing head is in the supply location to receive a label from the label magazine and is then moved back to the retracted position for movement of the dispensing head to the delivery location where the label carrier is again moved to the label transfer position to transfer the label to an adjacent open mold prior to mold closing for the blow molding.

8. An in-mold labeling system for use with a rotary blow molding machine including a rotary wheel having molds thereon movable between open and closed positions to perform blow molding, comprising:

a pair of label magazines for storing a supplies of labels at a location adjacent the rotary wheel of the blow molding machine;

a dispensing head including a pair of label carriers for transferring the labels from the label magazines to a pair of open molds prior to mold closing for the blow molding;

a first electrical servomotor and a first cam mechanism driven thereby to move the dispensing head between a supply location adjacent the label magazine and a delivery location between the pair of open molds on the rotary wheel;

a second electrical servomotor and a second cam mechanism driven thereby to move the label carriers of the dispensing head between a retracted position and a label transfer position;

first and second electrical controllers for respectively operating the first and second servomotors; and an optical encoder for sensing rotation of the rotary wheel of the blow molding machine to operate the first and second controllers to separately drive the first and second servomotors such that the label carriers are moved from the retracted position to the label transfer position while the dispensing head is in the supply location to receive labels from the label magazines and are then moved back to the retracted position for movement of the dispensing head to the delivery location where the label carriers are again moved to the label transfer position to transfer the labels to the pair of open molds prior to mold closing for the blow molding, and the second controller operating the second servomotor faster while the dispensing head is in the delivery location than while in the supply location.

* * * * *